United States Patent [19]

Yamada et al.

[11] Patent Number: 4,805,581
[45] Date of Patent: Feb. 21, 1989

[54] ARRANGEMENT OF CANISTER-USED EMISSION CONTROL SYSTEM IN MOTOR VEHICLE

[75] Inventors: Tomiharu Yamada, Isehara; Atsushi Shizuta, Atsugi; Tomonori Shirata, Yokohama; Tetsuro Kondo, Isehara, all of Japan

[73] Assignee: Nissan Motor Co., Ltd., Yokohama, Japan

[21] Appl. No.: 127,164

[22] Filed: Dec. 1, 1987

[30] Foreign Application Priority Data

Dec. 2, 1986 [JP] Japan ................................ 61-287094

[51] Int. Cl.⁴ .......................... F02M 33/02; B60P 3/22
[52] U.S. Cl. ..................................... 123/519; 280/83 A
[58] Field of Search ................ 123/518, 519; 280/5 A

[56] References Cited

U.S. PATENT DOCUMENTS

| 3,800,978 | 4/1974 | Sigwald | 280/5 A |
| 4,411,441 | 10/1983 | Marcheix | 280/5 A |
| 4,469,340 | 9/1984 | Condet | 280/5 A |
| 4,550,923 | 11/1985 | Ogawa | 280/5 A |

Primary Examiner—Douglas Hart
Attorney, Agent, or Firm—Foley & Lardner, Schwartz, Jeffery, Schwaab, Mack, Blumenthal & Evans

[57] ABSTRACT

An arrangement of a canister-used emission control system in a motor vehicle. The canister is positioned within a safety zone which is enclosed by mechanically rigid members of the motor vehicle.

8 Claims, 3 Drawing Sheets

ARRANGEMENT OF CANISTER-USED EMISSION CONTROL SYSTEM IN MOTOR VEHICLE

BACKGROUND OF THE INVENTION

1. Field of the Invention

The present invention relates in general to an arrangement of an emission control system in a motor vehicle, and more particularly to an arrangement of an emission control system of a type which includes an activated charcoal canister 2. Description of the Prior Art In order to prevent the escape of fuel vapors from the fuel tank and the intake system of an internal combustion engine, evaporative emission control systems (EECS) have been widely employed in modern motor vehicles. In the systems, an activated charcoal canister is used to trap the vapors when the engine is shut off. Upon restarting, a flow of filtered air through the canister purges the vapors from the canister. The vapors go through one or more tubes (purge line) feeding into an induction passage downstream of a throttle valve of the intake system, and they are burnt in the engine.

However, the evaporative emission control systems hitherto proposed fail to prevent the escase of fuel vapors when the fuel tank is under feeding. In fact, during the feeding, fuel vapors escape from a mouth of a fuel filler tube.

In order to suppress or at least minimize this undesired matter, a measure of using an extra canister has been proposed, which is disclosed in Japanese Utility Model First Provisional Publication No. 50-3119.

This measure will be outlined in the following with reference to FIG. 5 of the attached drawings.

Numeral 1 denotes a fuel tank in which fuel "F" (gasoline or the like) is contained with a certain upper space "S" remained in the tank 12. An evaporation tube 3 extending from an activated charcoal canister 5 is connected to the ceiling of the fuel tank 1 and exposed to the space "S", so that fuel vapors produced in the tank 1 flow in the tube 3 and is trapped by the canister 5. Upon restarting of an associated engine, the vapors in the canister 5 are purged by a flow of filtered air therethrough and fed to an intake system of the engine through a feeding tube 5a. Denoted by numeral 4 is a ventilation tube which has one end projected into the fuel tank 1 and the other end connected to another activated charcoal canister 6. The canister 6 has a discharging tube 6a which is led to an open air. Thus, vapor-contained air led to the ventilation tube 4 is cleaned by the canister 6 before discharging into the open air. A fuel filler tube 2 is connected at its lower end to a lower portion of the fuel tank 1. A fuel inlet opening 2a of the fuel filler tube 2 is equipped with a suitable seal device which is constructed to suppress or at least minimize the escape of fuel vapors when a fuel feeding is being carried out with a fuel feeding gun 7.

Upon mounting, the canister 5 is mounted in an engine room of the motor vehicle and the other canister 6 is mounted in a rear portion of the vehicle where the fuel tank 1 is arranged.

However, the above-mentioned emission control system still has the following drawbacks originating from the position where the canister 6 is placed.

That is, usually, the mechanical strength of the rear portion of the vehicle body is considerably poor as compared with that of the engine room. Mounting the canister 6 to such a mechanically poor portion induces a considerable possibility of damaging or collapsing the canister 6 upon a vehicle collision, particularly when the vehicle is struck from behind. The collapse of the canister is quite dangerous because it may bring about a fire.

SUMMARY OF THE INVENTION

It is therefore an object of the present invention to provide in a motor vehicle an improved arrangement of a canister-used emission control system which is free of the above-mentioned drawbacks.

According to the present invention, there is provided an arrangment of a canister-used emission control system wherein the canister is positioned in a safety zone which is enclosed by mechanically strengthened members of a motor vehicle.

According to the present invention, there is provided an improved emission control system in a motor vehicle. The vehicle has a floor panel, a fuel tank mounted beneath the floor panel, two side members welded to lateral sides of the floor panel and extending along the same, a suspension member extending across the floor panel, and an exhuast tube, the floor panel having major and depressed portions which are bounded by a laterally extending raised wall part of the floor panel. The emission control system comprises an activated charcoal canister received in the depressed portion of the floor panel; a bracket secured to the depressed portion of the floor panel; means for detachably connecting the canister to the bracket, and a fuel vapor conveying tube extending from the fuel tank to the canister, wherein the canister is positioned within a given zone which is enclosed by the laterally extending raised wall part, the suspension member, the exhaust tube and one of the side members.

DETAILED DESCRIPTION OF THE INVENTION

Figure 1:
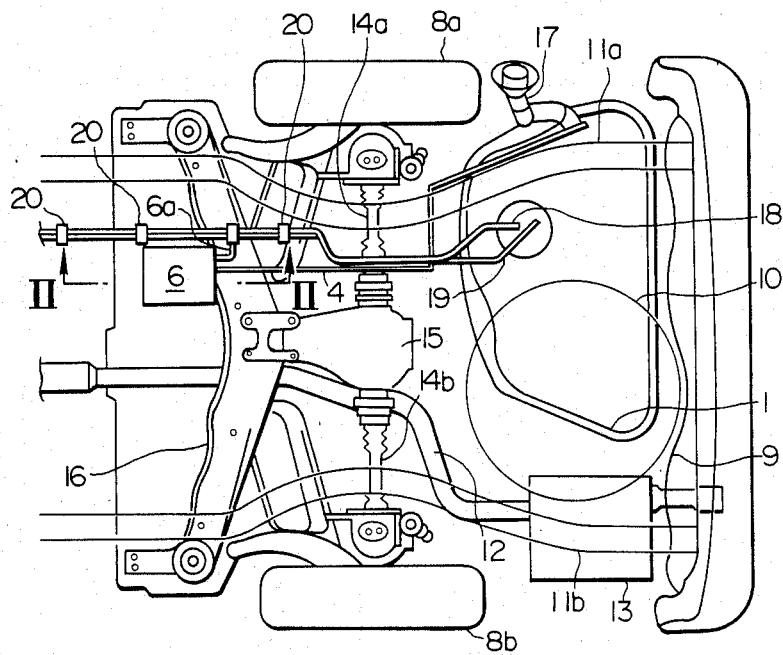
FIG. 1 is a transparent plan view of a rear portion of a motor vehicle, to which the present invention is practically applied.

Referring to FIG. 1 of the drawings, there is shown a transparent plan view of a rear portion of a motor vehicle, to which the present invention is practically applied.

Designated by numerals 8a and 8b are rear wheels of the vehicle. Behind the rear wheels 8a and 8b, there is arranged a fuel tank 1 which is mounted beneath a rear floor panel 9. A spare tire 10 is held in a tire container defined by the rear floor panel 9.

Two elongate side members 11a and 11b are welded to lateral sides of the rear floor panel 9 and extend along the same, as shown in the drawing. Extending along the longitudinal direction of the vehicle is an exhaust tube 12 which is equipped with a muffler 13 at its downstream portion.

Designated by numerals 14a and 14b are axles for the rear wheels 8a and 8b, which extend in opposed directions from a differential gear 15. A suspension 16 is arranged in front of the axles 14a and 14b in a manner to extend across the vehicle.

A fuel filler tube 17 is connected to the fuel tank 1. Extending from the fuel tank 1 are suction and return tubes 18 and 19 which are led to an induction system of an engine mounted in a front portion (viz., engine room) of the vehicle. With these tubes, fuel supply to the engine is carried out. Designated by numerals 20 and 20 are brackets for connecting the tubes 18 and 19 to the vehicle floor panel. Although not illustrated in FIG. 1, an evaporation tube held by the brackets 20 and 20 extends from the fuel tank 1 to an activated charcoal canister mounted in the engine room.

Figure 2:
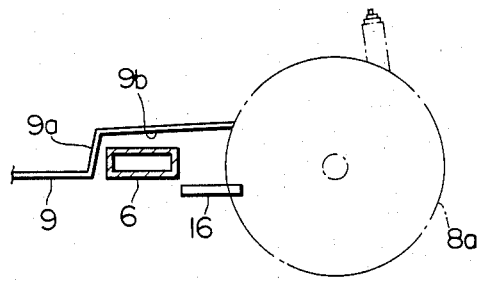
FIG. 2 is a sectional view taken along the line II—II of FIG. 1.

Another activated charcoal canister 6 is further employed, which is arranged near the suspension 16. As is understood from FIGS. 1 and 3, the canister 6 is shaped to have an oval cross section and arranged to lie in parallel with the longitudinal axis of the vehicle. As is seen from FIG. 2, the canister 6 is received in a depressed portion 9b of the floor panel 9 and connected to the same through a bracket "B" which will be described in detail hereinafter. Designated by numeral 9a is a laterally extending raised wall part of the floor panel 9, by which the major part of the panel 9 and the depressed portion 9b of the same are bounded.

More specifically, the canister 6 is positioned within a given zone which is enclosed by the raised wall part 9a, the laterally extending suspension 16, the exhaust tube 12 and the side member 11a.

A ventilation tube 4 extends from a neck portion of the fuel filler tube 17 to the canister 6 from which a discharge tube 6a extends to an open air. If desired, the purge air opening of the canister 6 may be used as a substitute for the discharge tube 6a. Of course, in this case, the discharge tube 6a can be removed.

Figure 3:
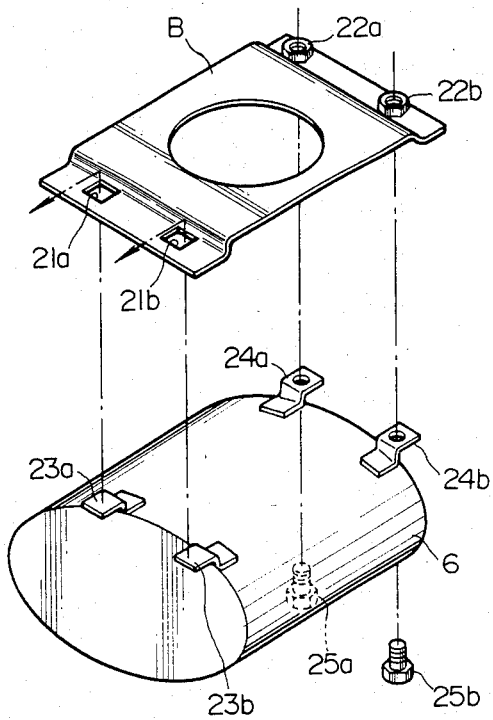
FIG. 3 is a perspective view of a canister and a bracket which are in disassembled condition.
Figure 4:
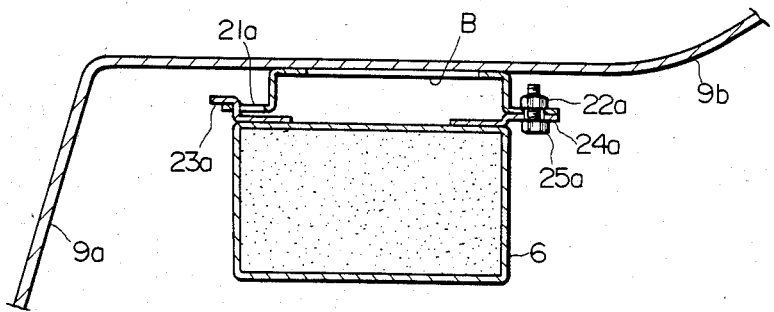
FIG. 4 is a sectional view of the canister and the bracket in an assembled condition.
Figure 5:
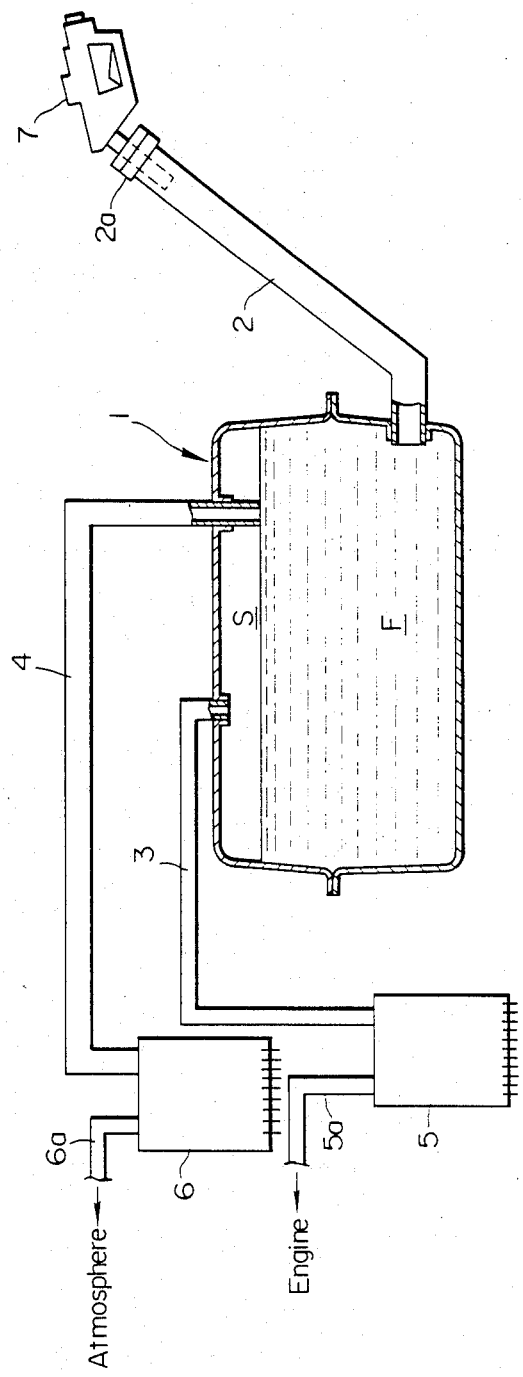
FIG. 5 is a schematical illustration of a conventional emission control system using two canisters.

Referring to FIGS. 3 and 4, there is shown the manner for detachably mounting the canister 6 to the depressed portion 9b of the floor panel 9.

A rectangular bracket "B" is used, which is welded at its major portion to the floor panel 9b and has flanges at its longitudinally opposed ends. One flange is formed with two rectangular openings 21a and 21b, while the other flange is formed with two circular openings to which respective nuts 22a and 22b welded to the flange are mated. The canister 6 has two pairs of lugs 23a, 23b, 24a and 24b welded thereto The lugs 24a and 24b are formed with circular openings.

Upon assembly, the lugs 23a and 23b of the canister 6 are put into the rectangular openings 21a and 21b of the bracket "B" having the other lugs 24a and 24b mated with the nuts 22a and 22b of the bracket "B". Then, two bolts 25a and 25b are screwed to the mated lugs 24a and 24b and nuts 22a and 22b to tightly fasten the canister 6 to the bracket "B".

As is described hereinabove, in accordance with the present invention, the canister 6 is positioned within the given zone which is enclosed by the rigid parts such as the raised wall part 9a of the floor panel 9, the laterally extending suspension 16, the exhaust tube 12 and the side member 11a. This means that the canister 6 is placed in a relatively safety zone of the rear portion of the vehicle. Thus, the possibility of breaking the canister 6 upon a vehicle collision is assuredly lowered or at least minimized. In particular, since the canister 6 is arranged in front of the rear wheels 8a and 8b, it is effectively protected even when the vehicle is struck from behind.

What is claimed is:

1. In a motor vehicle having a floor panel, a fuel tank mounted beneath said floor panel, two side members welded to lateral sides of said floor panel and extending along the same, a suspension member extending across said floor panel, and an exhaust tube, said floor panel having major and depressed portions which are bounded by a laterally extending raised wall part of the floor panel, an emission control system comprising:
an activated charcoal canister received in said depressed portion of said floor panel;
a bracket secured to said depressed portion of said floor panel;
means for detachably connecting said canister to said bracket; and
a fuel vapor conveying tube extending from said fuel tank to said canister;
wherein said canister is positioned within a given zone which is enclosed by said laterally extending raised wall part, said suspension member, said exhaust tube and one of said side members.

2. An emission control system as claimed in claim 1, in which said canister is constructed to have an oval cross section, and in which said canister is arranged to lie in parallel with the longitudinal axis of said floor panel.

3. An emission control system as claimed in claim 2, in which said means comprises:
two flanges integrally formed on said bracket, one flange being formed with two openings and the other flange being provided with two nuts welded thereto;
two pairs of lugs fixed to said canister; and
two bolts,
wherein upon assembly, one pair of said lugs are put into said openings of the flange having the other pair of lugs mated with said nuts of the other flange and said bolts are engaged with said nuts to fasten said canister to said bracket.

4. An emission control system as claimed in claim 3, further comprising:
another activated charcoal canister arranged at a position distant from said fuel tank; and
another fuel vapor conveying tube extending from said fuel to said another canister.

5. An emission control system as claimed in claim 3, further comprising a discharge tube which extends from said canister to an open air.

6. An emission control system as claimed in claim 3, in which said canister has an opening through which ventilation air is fed into said canister.

7. An emission control system as claimed in claim 1, in which said fuel vapor conveying tube has one end connected to a neck portion of a fuel filler tube connected to said fuel tank.

8. An emission control system as claimed in claim 7, in which said fuel filler tube has at its mouth portion a sealing device which is constructed to suppress the escape of fuel vapors when the fuel tank is under feeding with a fuel feeding gun mated with said mouth portion of the fuel filler tube.

* * * * *